Jan. 27, 1970  A. ZUCCHINI  3,491,958
REFUSE DISPOSAL

Filed Nov. 14, 1966  2 Sheets-Sheet 1

INVENTOR.
ANTONIO ZUCCHINI
BY
Ward, Haselton, McElhannon, Orme, Brooks, & Fitzpatrick
ATTORNEY

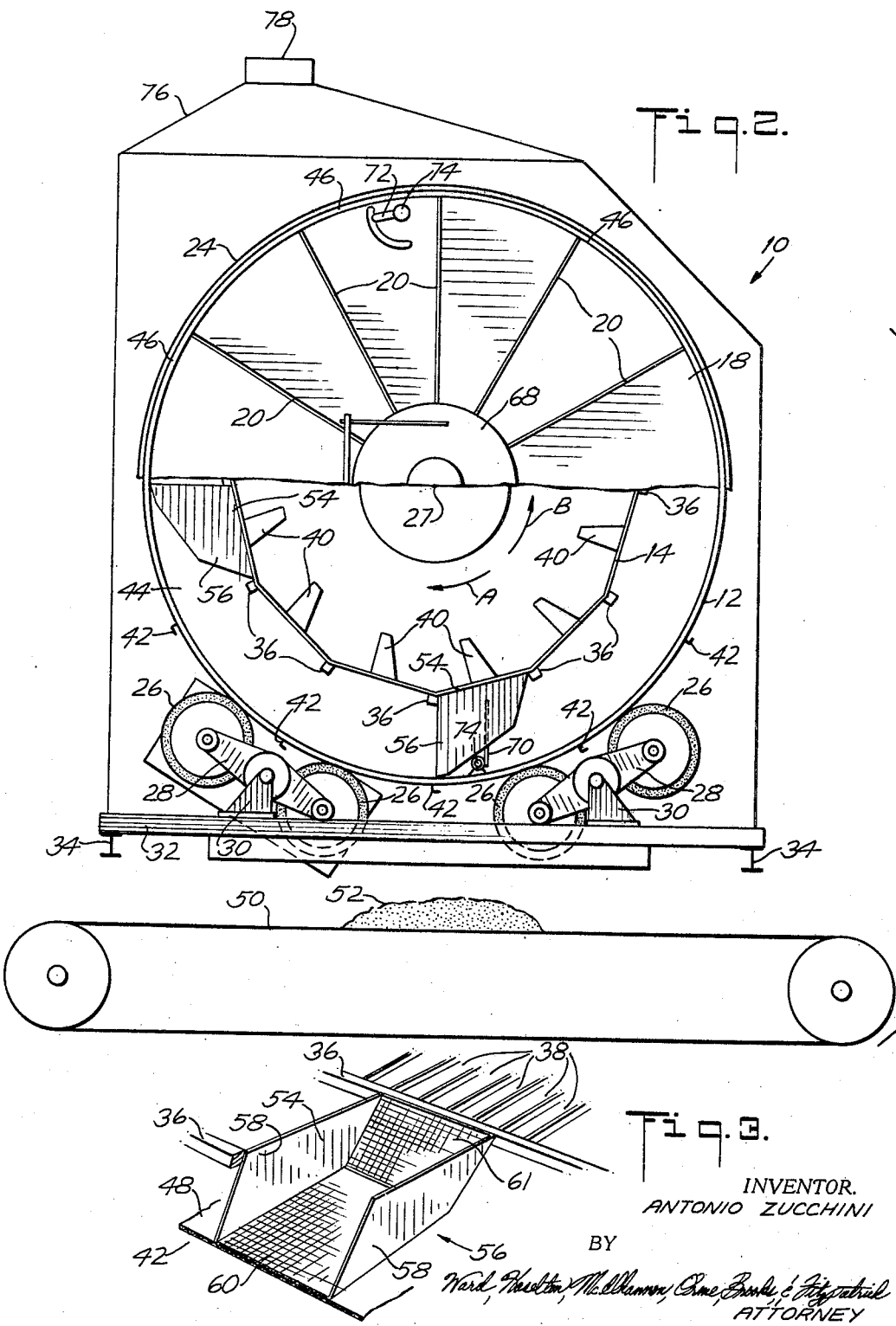

United States Patent Office 3,491,958
Patented Jan. 27, 1970

3,491,958
REFUSE DISPOSAL
Antonio Zucchini, Milan, Italy, assignor to Public Consult
S.p.A., Milan, Italy, a corporation of Italy
Filed Nov. 14, 1966, Ser. No. 593,809
Claims priority, application Italy, Nov. 13, 1965,
25,244/65
Int. Cl. B02c 13/00, 17/00, 17/02
U.S. Cl. 241—79.3                22 Claims

ABSTRACT OF THE DISCLOSURE

A device for mechanically working refuse. The refuse is tumbled in an inner drum and is divided by the action of the harder particles on the softer particles. The tumbled trash is periodically cast upon a mesh forming an outer drum to separate the sub-divided particles. There are also provided hoppers on scoops for returning residual material to the inner drum for further processing.

---

This invention relates to the treatment of refuse such as garbage, trash and the like which contains both organic and inorganic material. More particularly the present invention involves the mechanical treatment of such refuse in a novel manner so as to promote the fermentation of the organic material contained therein for conversion into organic fertilizers and composts.

The basic idea of utilizing mechanical treatment and biological fermentation for the conversion of refuse into fertilizer is well known. However, the various types of apparatus which attempt to shred the refuse by direct mechanical treatment have certain inherent disadvantages. Among these disadvantages are the necessity for hand working the refuse in order to separate therefrom those inorganic portions such as metal or glass which would interfere with the shredding blades. Another disadvantage is the fact that such mechanical treatment results in the production of noxious gases and fumes which produce considerable nuisance and danger to health.

The present invention is not subject to any of the disadvantages described above. According to the present invention, refuse is mechanically treated in such a manner that the organic components are automatically separated from the total mass of the refuse material. According to the present invention, the separation of the organic material which can be converted into an organic fertilizer does not take place until after the shredding has been completed. This automatic selective capability allows the total elimination of conventional manual pre-separation.

The present invention moreover permits the mechanical treatment of refuse without any manual contact whatsoever with the refuse, with no danger to the public health, and with no unpleasant odors or nuisance either to persons working in the vicinity or to those who may reside in the general area.

The present invention makes use of the various diverse materials making up the refuse itself (e.g., from cotton to domestic refuse, bones, stones, glass and metal), to act as the shredding agents. That is, the hard and tenacious components of the refuse mass operate as shredding elements and act on the soft, incoherent and brittle components so as to shred the latter until the desired reduction in particle size thereof is obtained. Thus the conventional shredding blade of prior known shredding equipment is eliminated. The present invention instead includes means for guiding and controlling the movement of the refuse mass in a manner such that it is maintained in a generally homogenous consistency while undergoing a generally tumbling type movement so as to obtain the shredding action.

According to the present invention, the mass of refuse under treatment is kept continuously in motion, this serving to promote a very high oxygenation of the organic material. This serves to initiate the aerobic fermentation process (without of course causing substantial decay), while the material is still undergoing mechanical treatment. As a result, a substantially odorless product can be obtained.

The high oxygenation is made possible by providing suitable air suction and air discharge means in the vicinity of the mechanical treatment.

According to one aspect of the present invention there is provided an apparatus for achieving the above described mechanical treatment, said apparatus comprising a first internal drum and a second external drum arranged in coaxial relationship and connected to rotate together. Means are provided for guiding and controlling the movement of the refuse mass inside the first or internal drum, such means serving to promote the shredding and to effect a first riddling of the mass while it is inside the internal drum. Means are provided to effect a second or final riddling of material in the second or outer drum. There are additionally provided means for returning material back into the first drum while the drums are being rotated in one direction, such material being only that portion composed of particles greater than a given size. Means are additionally provided for discharging or ejecting the residual material while the drums are rotated in a reverse direction.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification wherein:

FIG. 2 is a section view taken along lines 2—2 of FIG. 1; and

FIG. 3 is a fragmentary perspective view illustrating a portion of the internal configuration of the apparatus of FIGS. 1 and 2.

Figure 1:
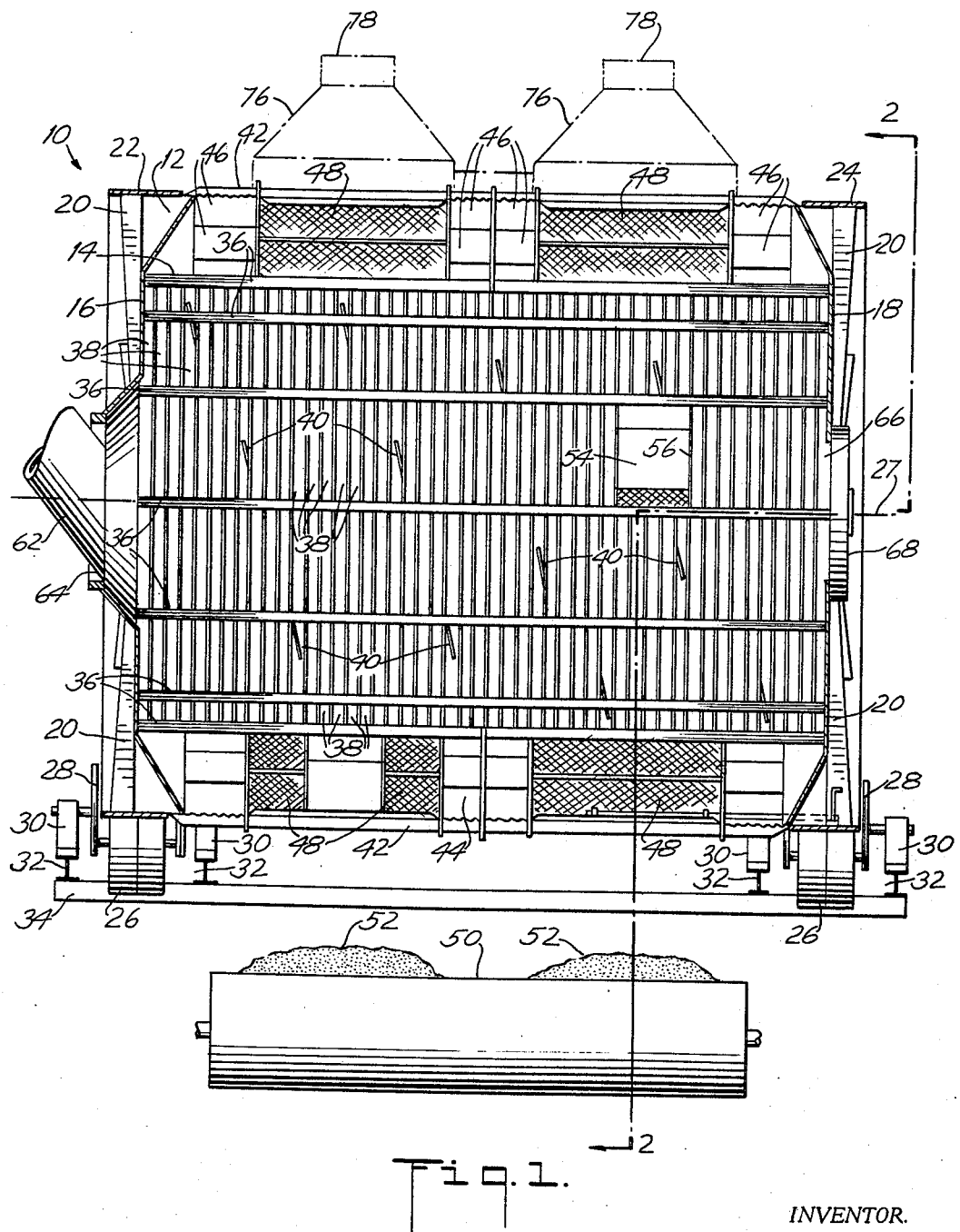
FIG. 1 is a section view taken in elevation illustrating an apparatus embodying the present invention.

As shown in FIG. 1, a refuse treating apparatus, illustrated generally at 10 is seen to be made up of an external drum 12 and an internal drum 14 arranged one within the other in coaxial alignment. The drums are enclosed and held together by means of common front and back plates 16 and 18, so that they rotate in unison. The plates 16 and 18 are reinforced by means of radially extending strengthening ribs 20. Front and rear support rings 22 and 24 are attached to the tips of the strengthening ribs 20; and these support rings rest upon rubber tired rollers 26 (FIGS. 1 and 2) which permit the dual drum assembly to rotate about a horizontal axis 27 as shown in the drawings.

The rollers 26 are arranged in pairs as shown in FIG. 2, the rollers of each pair being rotatably mounted at opposite ends of a rocker arm 28. The rocker arm 28 in turn is pivotally supported at its center by means of a fixed support element 30. The support elements 30 are mounted on a cross beam 32 which in turn rests on fixed I-beam supports 34. Suitable electric motors (not shown) are arranged to drive one or more of the wheels 26 so as to cause the drums 12 and 14 to rotate.

The internal drum 14 is formed by means of internal drum stringers 36 which extend in an axial direction between the front and back plates 16 and 18; and which are distributed circularly about the rotational axis 27 of the drums. A plurality of blade elements 38 are provided and these are mounted to extend in a generally circumferential direction between adjacent internal drum stringers 36. The blade elements 38, as shown, are equally spaced from one another.

There are additionally provided a plurality of paddle members 40 which extend upwardly in a generally radial direction from certain of the blade elements 38. As shown in FIG. 1, the paddle members 40 are inclined slightly with respect to their associated blade elements 38; this inclination being such that when the drums 12 and 14 are rotated in the direction of the arrow A in FIG. 2, refuse material located within the internal drum 14 will be urged in a generally rightward direction as viewed in FIG. 1. The paddle members 40 serve the dual function of helping to shred as well as to mix and uniformly distribute the material located within the internal drum 14.

The external drum 12 is formed with a plurality of external drum stringers 42 which, as shown in FIG. 1, also extend between the front and back plates 16 and 18; and which, as shown in FIG. 2, are distributed in circular arrangement about the rotational axis of the drums in a manner such that they surround the internal drum 14. There is thus defined between external and internal drums 12 and 14 a generally annularly shaped open space 44. The external drum 12 is enclosed partially by means of solid cylindrical outer plates 46 which extend between and are secured to the outer drum stringers 42. The outer plates 46, however, are interrupted and replaced at two axially displaced locations with a screen or mesh 48 having a predetermined mesh opening size. Thus any particles of material located within the space 44 having a size smaller than the openings in the mesh 48 will fall out of the external drum 12 and will drop down upon a conveyor belt 50 as shown in FIGS. 1 and 2. This material, which is illustrated generally at 52, is then carried away by movement of the belt 50.

The internal drum 14 is formed with two pairs of openings 54 extending therethrough. The openings in each pair are positionally aligned with one of the mesh locations 48 in the external drum 12. The openings 54 of each pair are displaced from one another by 180°; and they are each displaced by 90° from their corresponding openings making up the other pair. This provides a degree of symmetry and balance to the system.

The openings 54 each lead into a hopper element 56. This hopper element, as shown in FIG. 3 comprises a pair of side plates 58 which extend the whole distance across the space 44 between the internal drum 14 and external drum 12. There are additionally provided bottom and back plates 60 and 61 which together extend the whole distance across the space 44 along the bottom edges of the side plates 58. The hopper elements 56 open in a direction coinciding with the movement of the drums in the direction of the arrow A. It will be noted that the hopper elements 56 are dimensioned to coincide with the openings 54 leading into them and are further dimensioned to coincide with the substantial part of the corresponding mesh 48 with which they are associated.

There is provided a feed hopper 62 of generally tubular configuration, through which refuse material to be processed is fed into the device 10. This feed hopper 62 extends through an opening 64 formed in the front plate 16 so that the material to be processed is inserted into the internal drum 14 toward the front end thereof. There is additionally provided an opening 66 in the center of the back plate 18 such opening providing access for inspection and for repairing. The opening 66 is closed during normal usage by means of a cover 68.

There are provided at various locations about the external drum 12, various shutters 70 which may be opened for the discharge of residual material. It will be noted from FIG. 2 that these shutters open in a direction opposite that of the opening of the hoppers 56. The reason for this will become more apparent in connection with the following description of operation of the device. The opening and closing of the shutter 70 is controlled externally by means of a crank 72 and a connecting shaft 74. Actuation of the crank 72 may be achieved either manually or electrically.

Both of these drums 12 and 14 are covered with a suitable housing 76. This housing is provided with suitable air intake openings 78.

The above described system operates in the following manner: Refuse material to be processed is fed into the interior of the internal drum 14 via the feed hopper 62. During this time the two drums are rotated in the direction of the arrow A. The material which is fed into the internal drum 14 is continuously tumbled and becomes shredded by virtue of the crushing effect which takes place between the hard and tenacious components and the soft and incoherent components making up the refuse material itself. Additional shredding is achieved by virtue of the sliding of these components against the blade elements 38 and against the paddle members 40. The blade elements 38 and the paddle members 40 additionally serve to homogenize the refuse material and uniformly distribute it by transferring it generally toward the right end of the drums as viewed in FIG. 1. As the drums rotate some of the material passes between the blade elements 38 while other portions of the material pass down through the openings 54 and through the hoppers 56 into the space 44 between the internal drum 14 and the external drum 12. This material is thus cast out onto the mesh 48. The particle components of this material which are small enough to pass through the openings in the mesh 48 then drop down as indicated at 52 onto the belt 50 and are transferred to a further working station (not shown).

The portion of the processed material which does not pass through the openings of the mesh 48 is scooped up by the hopper 56 as the drums continue to rotate in the direction of the arrow A. This material is thus thrown back into the internal drum 14 and is reprocessed by further tumbling. Thereafter it again passes out through the hopper 56 and is cast onto the mesh 48.

Eventually all that remains inside the drums 12 and 14 are residual components of the refuse material which has been processed. This material, which cannot be shredded, is disposed of in the following manner: The drums are reverse rotated in the direction of the arrow B (FIG. 2) and the shutters 70 are opened. During this reverse rotation, the residual material passes out from the internal drum 14 via the openings 54 and hoppers 56 into the space 44 between the drums. It then passes out through the shutters 70. This residual material may then be carried away either via the belt 50 or via some other transfer mechanism.

Having thus described the invention with particular reference to the preferred form thereof, it will be obvious to those skilled in the art to which the invention pertains, after understanding the invention, that various other changes and modifications may be made therein without departing from the spirit and scope of the invention, as defined by the claims appended thereto.

What is claimed as new and desired to be secured by Letters Patent is:

1. Apparatus for treating refuse for the successive fermentation and conversion of the same into fertilizers and composts, said apparatus comprising a first internal drum and a second external drum connected together and concentrically disposed, means for rotating said drums together in both forward and reverse directions, means for guiding and controlling the movements of the refuse mass inside said first internal drum, means for shredding and achieving a first riddling of said mass associated to said first internal drum, means for achieving a second and final riddling associated with said second external drum, ventilation means, and means for bringing back in cycle, during the rotation of said drums in one direction, the already shredded and distributed portions of said mass made up of particles having a particle size greater than a preselected amount, and for producing during the rotation of said drums in said reverse direction, the discharge to the outside from said second drum, of the residual portions of said mass.

2. Apparatus as in claim 1, wherein the means for guiding and controlling the movements of the refuse mass inside the first internal drum comprises a plurality of members arranged to project toward the inside of said drum, each of said members having a plane which is inclined with respect to the transverse plane of said internal drum, said projecting means facilitating the material distribution within said first drum, and the mixing of the same, whereby the mass of refuse additionally functions, during the operation of the apparatus, to shred said refuse material.

3. Apparatus as in claim 2 wherein said projecting members are all inclined by the same amount and in the same direction.

4. Apparatus as in claim 1, wherein said internal drum is formed by a plurality of blade elements forming substantially the full internal surface of said drum, said blade elements having the double function of shredding and of riddling the refuse mass.

5. Apparatus as in claim 4 wherein the axis of each blade element is at right angles with respect to the axis of the drum.

6. Apparatus as in claim 1, wherein the surface of the first and second drums define between them an annular hollow space adapted to receive the material shred, homogenized and riddled by said first internal drum, the outer surface of said second drum being at least partially formed by a mesh which causes said second and final riddling of the material collected in said annular hollow space.

7. Apparatus as in claim 6 wherein the means for recycling the already shred and homogenized material having a particle size greater than said preselected amount comprises members connecting the first drum to the second drum through the hollow space formed between said two drums and adapted to collect the material not riddled by said mesh and to bring the unriddled material, during the rotation of said pair of drums in said forward direction, back into said first drum, and for causing, during the rotation of said pair of drums in said reverse direction, the discharge to the outside of the residual material through shutters provided on said second drum.

8. Apparatus as in claim 7 wherein said first internal drum is provided with openings each leading into a hopper element, said hopper elements being shaped to collect, during the rotation of the pair of cylinders in said forward direction, the material which is not riddled by said mesh, and to bring said material back, through said openings, into said first internal drum for further shredding.

9. Apparatus as in claim 8 wherein each said hopper element is constructed and arranged such that during the rotation of said drums in said reverse direction, said hopper elements connect the interior of said first internal drum with the annular hollow space between said drums for transferring the material which cannot be further shred into said annular hollow space, and also allow the discharge to the outside of said material through shutters provided on the lateral surface of the second external drum.

10. Apparatus as in claim 1, wherein said pair of drums is supported by a plurality of pairs of rollers, at least one of said rollers being driven by a motor.

11. Apparatus as in claim 1 wherein said drums are enclosed by a covering provided with openings for air intake and discharge.

12. Apparatus for processing refuse which contains organic and inorganic matter, said apparatus comprising a plurality of blade elements arranged to define a first chamber for containing said refuse, means arranged and constructed to move said first chamber in a manner to produce a tumbling action of the refuse thereinside, thereby to effect a mixing of the refuse and a grinding of the organic matter by movement therethrough of the inorganic matter, means defining a mesh and means arranged to effect discharge of the tumbled refuse from said first chamber onto said mesh.

13. Apparatus as in claim 12 and further including means for returning the material which does not pass through said mesh back into said first chamber for re-tumbling.

14. Apparatus as in claim 12 wherein said first chamber comprises a first drum arranged to be rotated about a horizontal axis.

15. Apparatus as in claim 14 wherein said mesh is arranged around said first drum in displaced but concentric relation thereto in the form of a second drum.

16. Apparatus as in claim 15 wherein said first and second drums are interconnected to rotate together.

17. Apparatus as in claim 16 wherein said means arranged to effect discharge of the tumbled refuse comprises a hopper leading from the interior of said first drum to the region between said two drums.

18. Apparatus as in claim 17 wherein said means for returning the material back into said first drum comprises a plate extending between said drums and lying in a plane which is parallel with the axis of said drums, and which forms an angle with a radial of said drums passing through said plate and defining one wall of said hopper.

19. Apparatus as in claim 18 further including means defining an axial input opening at one end of said first drum.

20. Apparatus as in claim 17 wherein the interior of said first drum includes canted blades for effecting gradual axial movement of the material tumbling therein from said input opening toward said hopper.

21. Apparatus as in claim 20 wherein the interior of said first drum additionally includes rabble teeth.

22. Apparatus as in claim 15 wherein there is provided an air shroud around said drums for controlling the oxygenation of said material.

References Cited

UNITED STATES PATENTS

| | | | |
|---|---|---|---|
| 1,441,584 | 1/1923 | Isbell | 241—80 |
| 2,480,085 | 8/1949 | Mitchell | 241—80 X |
| 3,235,188 | 2/1966 | Bradley | 241—74 |

ROBERT C. RIORDON, Primary Examiner

D. G. KELLY, Assistant Examiner

U.S. Cl. X.R.

241—80, 91, 284, 299